Patented Nov. 26, 1935

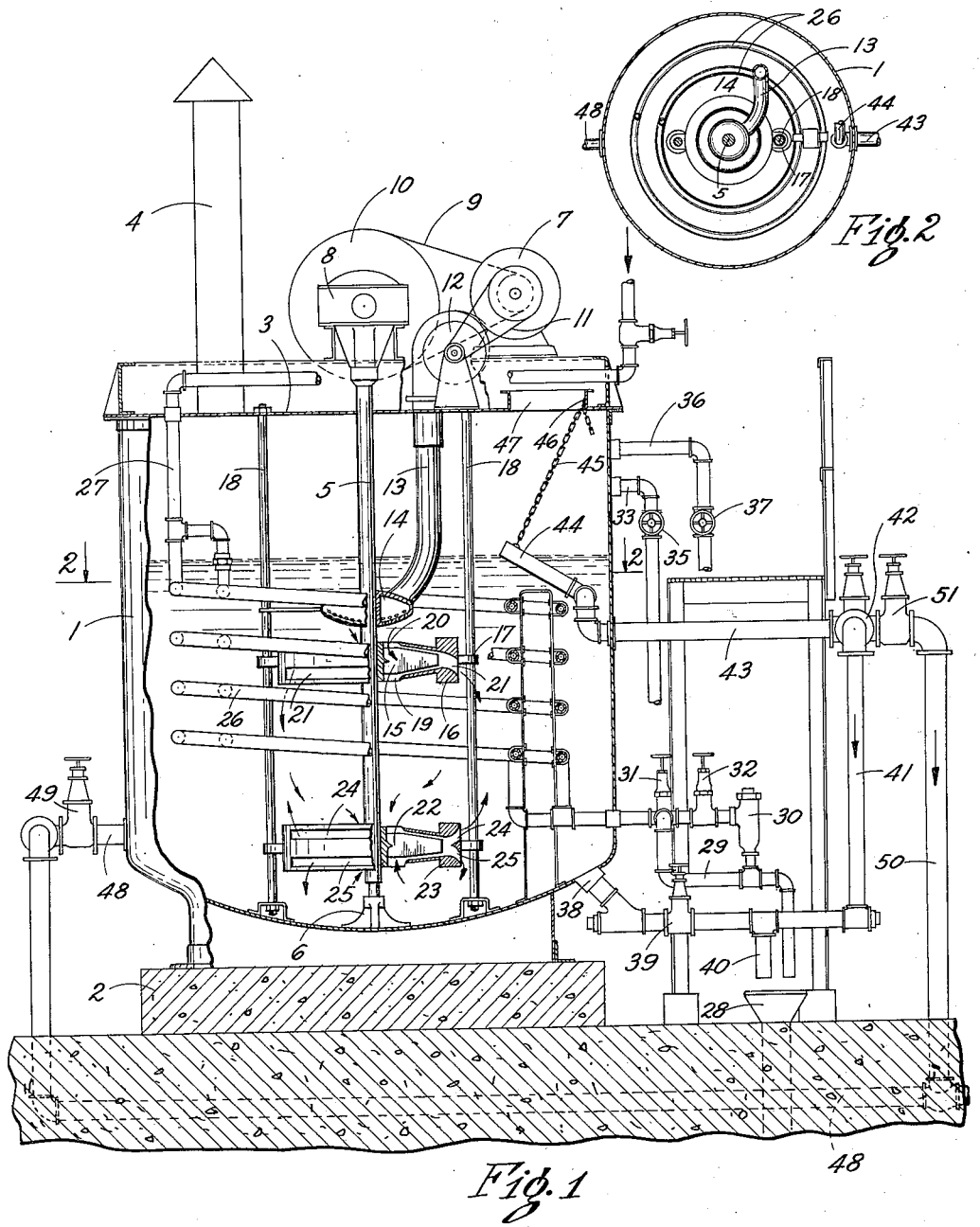

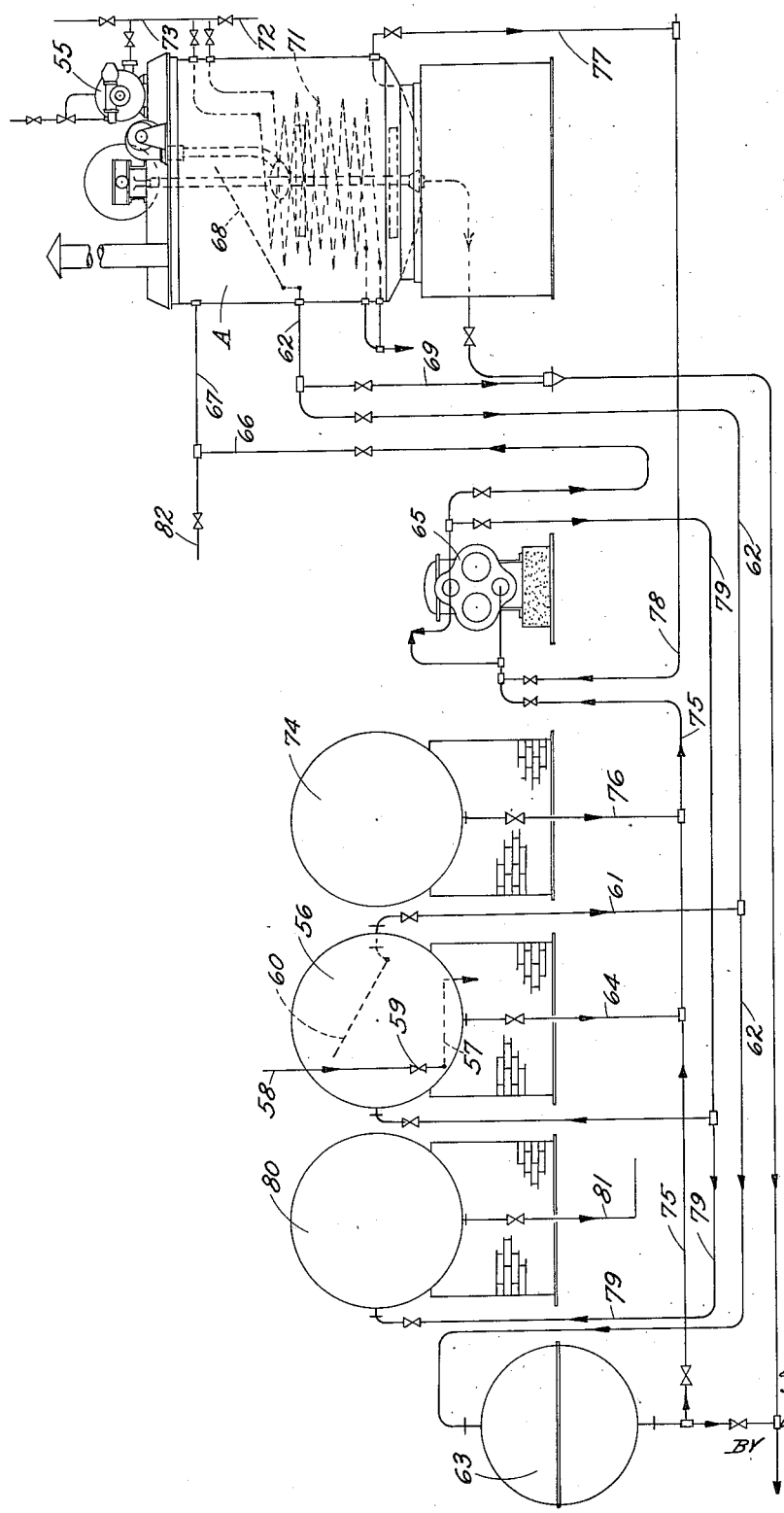

2,022,550

UNITED STATES PATENT OFFICE 2,022,550

METHOD OF REGENERATING SODIUM PLUMBITE SOLUTION

Frederick W. Stone and James N. Garrison, Cleveland, Ohio

Application November 11, 1933, Serial No. 697,648

3 Claims. (Cl. 23—51)

This invention relates to an improved method of regenerating spent sodium plumbite or "doctor solution" and the present application contains subject matter in common with our United States patent application, Serial No. 650,292, filed January 5, 1933.

Sodium plumbite solution is principally used for chemically treating or sweetening petroleum products, principally gasoline and kerosene. The sodium plubite ($Na_2PbO_2$) converts certain disagreeable smelling sulphur compounds and mercaptans to other compounds which are not disagreeable and also removes some of the sulphur compounds. The sodium plumbite solution used in the industry is commonly referred to as "doctor solution" and consists principally of a solution of lead oxide, caustic soda and water in varying proportions according to the result desired.

In the process of sweetening petroleum products it is usually necessary to add elementary sulphur and this, together with the sulphur in the petroleum products, converts most of the lead in the sodium plumbite into lead sulphide. The spent "doctor solution" which results after the conversion of the sulphur is a black sludge consisting principally of oil, lead sulphide, caustic soda and sodium sulphide. Because of the difficulties which have been experienced in reclaiming the spent "doctor solution" the usual practice has been to remove it as a waste product. This results in a serious economic loss and is also frequently a nuisance as the lead sulphide contaminates any streams or bodies of water into which the waste "doctor solution" may be discharged. It has been proposed to reclaim and revivify the spent "doctor solution" by blowing compressed air through the solution. Without going into the details of the chemical reaction involved it may be stated that this aeration of the spent solution results in a conversion of the lead sulphide and caustic soda into sodium plumbite and water in substantially the same form as the solution before the reaction with the sulphur in the oil.

Attempts to regenerate the solution in this manner, with which we are familiar, have not been successful due to the excessive power required to cause a sufficient quantity of air to mix with the spent solution and to inefficiencies in the procedure followed.

Among the objects of our invention are: the provision of an improved method of treating spent "doctor solution" to reclaim and return it to its original condition; the provision of a method of handling sodium plumbite or "doctor solution" in which the spent "doctor solution" may be revivified and used over and over again with a minimum of loss; the provision of a method of regenerating spent sodium plumbite in which the oil in the spent solution is practically completely removed from the solution thereby greatly increasing the efficiency of the process and the percentage of lead sulphide which may be converted into sodium plumbite in a given length of time.

The above and other objects of our invention will appear from the following description of our improved apparatus and method, reference being had to the accompanying drawings, in which—

Figure 1 is a side elevation partly in section of our improved mixing apparatus.

Figure 2 is a cross section, on a reduced scale, taken on line 2—2 of Figure 1.

Figure 3 is a diagrammatic side elevation of apparatus adapted to carry out our improved method of regenerating sodium plumbite.

In the drawings (Figures 1 and 2) the tank 1 is suitably mounted on a base or foundation 2 and is provided with a top cover plate 3. The chimney 4 serves to carry away vapors which may arise from the liquid being treated in the tank. A vertical shaft 5 is centrally disposed in the tank 1 and may have a bearing at its lower end in the bracket 6. The upper end of the shaft 5 is connected to the driving motor or other prime mover 7 through the gear box 8, which in the illustration shown is adapted to transmit power at right angles, and the belt or chain 9 which connects the pulley or sprocket 10 to the motor 7. A second belt or chain 11 is adapted to drive the blower fan 12 from the motor 7. This fan 12 may be of any suitable type and takes air from the atmosphere and causes it to flow at relatively low pressure, downwardly through a pipe 13 into the tank 1. The lower end of the pipe 13, as shown, comprises an annular outlet member 14 which is provided with a plurality of holes on its lower side. The drive shaft 5 passes through the central opening in the annular outlet 14.

An impeller unit 15 is secured to the shaft 5 immediately below the outlet member 14. This impeller 15 preferably includes a plurality of radially extending blades mounted on a hub and is, of course, rotatable with the shaft 5. The housing 16 for the impeller 15 is supported by lugs 17 which are clamped on or otherwise suitably attached to the vertically extending rods 18.

The housing 16 is provided with annular top and bottom inlet openings 19 and 20 and with a slot-like circumferentially extending outlet opening 21. As seen in Figure 1 this outlet opening 21 is adapted to discharge fluid in a downwardly direction as indicated by the arrows on the drawings.

Another agitating impeller 22 is mounted on the shaft 5 below the impeller 15. This impeller 22 is substantially the same as impeller 15 but the impeller housing 23 is provided with split circumferentially extending outlet slots 24 and 25 and it will be seen that fluid which is drawn in through the inlet openings by the rotation of the impeller 22 will be divided and part directed upwardly through the outlet slot 24 and part downwardly through the outlet slot 25. The impellers 15 and 22 are preferably vertically adjustable on the shaft 5 and the housings 23 and 16 may also be moved vertically on the rods 18. Thus, the agitating units may be spaced to give the most effective operation and it will be understood by those skilled in the art that any desired number of agitating units may be mounted on the shaft 5 as deemed necessary or desirable.

In order to maintain the liquid being treated at the proper temperature we have provided a pipe coil 26. Steam may be admitted to this coil through the pipe 27 and discharged either directly into the sewer connection 28 through the pipe 29 or by-passed into the sewer through the steam trap 30 by means of proper manipulation of the control valves 31 and 32.

The liquid to be treated (spent doctor solution) is conveyed to the tank 1 through the pipe 33 and a valve 35 is interposed in the pipe to control the flow therethrough. Another inlet pipe 36, having a valve 37, may be provided to supply water to the tank 1 to maintain the proper concentration of the solution.

A bottom outlet 38 controlled by a valve 39 is adapted to discharge the contents of the tank 1 into the sewer 28 through pipe 40. The pipe 40 is also connected through pipe 41, valve 42 and pipe 43 to the pivoted skimmer pipe 44. This pipe 44 may be secured in the desired position by means of a chain 45 which engages a suitable hook 46 on the side of the hand hole 37 in the cover plate 3. The function of the skimmer pipe 44 will be later explained.

The regenerated "doctor solution" may be withdrawn from the tank 1 through the pipe 48 which extends into the tank 1 and has an inlet opening adjacent the bottom of the tank. The pipe 48 may be connected to a suitable pump or other means for withdrawing the liquid and the flow through the pipe can be controlled by the valve 49.

If desired the liquid which is skimmed off by the skimmer pipe 44 may be conducted to the pipe 48 through pipe 50 instead of discharging it into the sewer through the pipes 41 and 40. By proper manipulation of the valves 42 and 51 the disposal of the skimmed liquid may be controlled.

In Figure 3 we have diagrammatically illustrated a layout of apparatus adapted to carry out our improved method of regenerating sodium plumbite. In this layout the agitating unit which is generally indicated at A, is substantially the same as that illustrated in Figures 1 and 2 and described above. It should be noted, however, that the unit A is driven by a steam turbine 55, as distinguished from the electric motor 7, shown in Figure 1 and the piping arrangements are not exactly the same. These differences will become evident from the following description of Figure 3.

The spent "doctor solution", after it has been used to sweeten the oil, is discharged into the storage tank 56 and may be kept at the desired temperature therein by the steam coil 57 which may be supplied with steam from the pipe 58 under the control of valve 59. A pivoted skimmer pipe 60 is disposed within the tank 56 and is adapted to skim off any oil which may rise to the surface of the spent solution during its stay in the tank 56. This oil may be conducted through the pipes 61 and 62 to the wash oil tank 63. The spent solution is withdrawn from the bottom of the tank 56 through the pipe 64 by the transfer pump 65. This pump 65 is adapted to force the spent solution through pipes 66 and 67 into the agitating unit A. The skimmer pipe 68 of unit A is preferably pivoted so that the proper quantity may be removed and the skimmed oil is conveyed to the tank 63 by gravity through the pipe 62. An oil by-pass pipe 69 is provided so that, if desired, the oil may be discharged into the sewer through pipe 70. The heating coils 71 of the unit A are supplied with steam through the pipe 72 from a suitable source of supply and are also adapted to utilize exhaust steam from the turbine 55 which is connected to the coil 71 through the pipe 73.

The pump 65 is connected to the caustic tank 74 through the pipes 75 and 76 and is adapted to withdraw caustic solution (NaOH) from the tank 74 and discharge it into the agitator A through pipes 66 and 67 for purposes which are fully described later. After the regenerating process has been completed in the unit A the regenerated doctor solution is withdrawn from the lower part thereof through the pipe 77. The pump 65 is suitably connected to the pipe 77 through the pipe 78 and is adapted to withdraw the regenerated solution and discharge it through pipe 79 into the regenerated "doctor solution" storage tank 80. The tank 80 is provided with a bottom outlet pipe 81 which conducts the solution to the treater where the oil is sweetened. In the layout above described it will be understood that valves are disposed wherever necessary to properly control the operation of the apparatus and are conventionally illustrated in the drawings. A single transfer pump 65 is so connected that it may be utilized to discharge the various fluids into the unit A and to withdraw the regenerated solution therefrom. Thus, by properly manipulating the control valves the pump can be connected to withdraw fluid from any one of the tanks 56, 63 and 74 and 80 through the pipe 75 and discharge the liquid into the tank of the regenerating unit A through the pipes 66 and 67. The water may be discharged into the unit A through the pipes 82 and 87.

Our improved method of regenerating the spent "doctor solution" will now be described, reference being had to the apparatus illustrated in Figure 3.

The spent "doctor solution", which always contains a certain amount of the oil which has been treated, is collected in the tank 56. While the solution remains in the tank 56 some of the oil may rise to the surface thereof and be skimmed off through the pipe 60 and carried by gravity to the oil tank 63. To start the operation, a charge of spent solution is withdrawn from the tank 56 and discharged into the tank of unit A. As noted above a portion of the oil which is contained in the spent solution may be separated out by simply heating the solution and allowing the lead sulphide to settle and the oil to rise to the surface where it may be removed by skimming. However, a certain portion of the oil is combined with the sodium hydroxide and the lead sulphide in the form of emulsion which will not break up by simple settling and heating. Therefore, in our improved process we heat the solution in the tank of unit A to the proper temperature, from approximately 150° F., to approximately 175° F., and by rotating the impellers of the unit A sufficiently rapidly the mixture is violently agitated, breaking up the emulsion of oil and lead sulphide and causing the lead sulphide particles to be scrubbed by the sodium hydroxide in the solution and freed from the oil. After the emulsion is broken the agitation of the mixture is continued but with less intensity in order to coagulate the lead sulphide particles and cause them to settle and also to coagulate the particles of oil so that they can rise to the surface and be withdrawn by skimming.

So far as we are aware no satisfactory means for breaking up the emulsion of oil and lead sulphide has been proposed prior to our invention. As it is necessary that substantially all of the oil be removed from the solution before successful oxidization of the lead sulphide can take place this step of our process is very important. Spent "doctor solution" from the treating of cracked distillates usually contains complex gums and tars and forms emulsion both in the water phase and in the oil phase. Simple heating will not break these complex emulsions. We are aware that some effort has been made to actually distill off the oil with superheated steam but it has been found that this operation costs more than the value of the recovered products and is not practical. It is also necessary to remove these complex tars and gums before regenerating the spent "doctor solution" or else the resultant sodium plumbite solution will be so contaminated that it will be worthless.

The regenerator unit A provides a means for controlled agitation and heating by which the emulsion of the oil with the sodium hydroxide and lead sulphide may be broken and oil free lead sulphide be precipitated. If necessary, additional elementary sulphur may be added to the solution during the precipitation stage to aid in the precipitation. After the oil has completely separated out, by the combined normal separation into strata and the breaking down of the emulsion and coagulation of lead sulphide and of the oil particles, as above noted, it is skimmed off by the pipe 68 and collected in the wash oil tank 63. The heating operation may now be continued until the solution reaches a temperature of approximately 175° F. (this temperature, however, is subject to rather wide variation). Provisions are made for adding fresh sodium hydroxide (NaOH) solution to the regenerator unit A so that sodium plumbite may be formed as rapidly as the lead sulphide is oxidized to lead sulphate or lead oxide.

Next the motor or steam turbine 7 is started driving the impellers 15 and 22 and the blower fan 12. The rotation of the impeller 15 causes the liquid to be drawn in through the inlet openings 19 and 20 and discharged downwardly through the circumferential slot 21. Air is blown into the liquid through the pipe 13 and the annular outlet head 14 and, as the holes in the head 14 are immediately adjacent the inlet opening 20, a large part of the air will be drawn down into the impeller 15 and caused to be intimately mixed with the liquid and discharged outwardly through the slot 21 and carried down into the tank with the liquid as indicated by the arrows. This downwardly moving body of mixed liquid and air is picked up by the impeller 22 and is again intimately mixed and agitated and thrown out through the outlet openings 24 and 25. The mixture which is discharged from the outlet 25 moves downwardly toward the bottom of the tank, and will, to a considerable extent, swirl around and be drawn back into the bottom inlet opening to the impeller 22. By providing a dual arrangement of impellers together with the air inlet which is adapted to supply the air directly into the inlet of one of the impellers, an extremely thorough and complete mixture and agitation of the liquid with the air is effected. The air is retained in the solution for a relatively long period of time with the result that very efficient oxidization is accomplished.

In the operation of our apparatus we have found that 90 to 95% of lead sulphide may easily be converted into sodium plumbite in a period of eight to ten hours. After the regeneration is completed the tank contains a clear sodium plumbite or "doctor solution" which is ready for use and equal in its effectiveness to fresh "doctor solution".

Frequently the regenerated "doctor solution" contains oil soluble impurities which, if permitted to remain in the solution, would discolor oil being treated thereby. These impurities can be removed by washing the solution with oil. As the oil which is skimmed from the spent "doctor solution" in the unit A is accumulated in the tank 63, and as this oil has already been sweetened, it is available for washing the regenerated "doctor solution". Therefore, if it is necessary to wash the regenerated "doctor solution", a portion of the skimmed oil is pumped to the regenerating unit A from the tank 63 through the pipes 66 and 67, after the regeneration reaction is finished, and is agitated together with the regenerated "doctor solution". After the washing action is completed the agitating impellers are stopped and the oil allowed to rise to the surface from whence it is skimmed and either carried to the refinery to be redistilled or discharged to waste. The above described oil washing of the regenerated "doctor solution" removes colored impurities and free sulphur and leaves the regenerated "doctor solution" equal to fresh "doctor solution".

The air pressure necessary to draw the air into the liquid need be very small and the power required by the blower fan 12 is negligible. In some cases the blower 12 may be omitted entirely as sufficient air will be drawn into the liquid through the pipe 13 from the atmosphere due to the suction of the impeller 13 which is effective at the inlet opening 20.

It will be seen from the above description of one form of our apparatus and our process for regenerating "doctor solution" that the regeneration cycle, including the steps of breaking the emulsion, oxidizing and oil washing of the regenerated solution is completed in a single unit. With our process we are able to return a high percentage of the spent sodium plumbite solution to useable form.

Although we have illustrated and described in considerable detail one form of apparatus which is particularly adapted for carrying out our improved process for regenerating spent "doctor solution", it will be understood that other modified forms and arrangements of apparatus may be used to carry out our process. Further, it will be understood by those skilled in the art that our regenerating process may be modified without departing from the spirit of our invention. We do not, therefore, limit ourselves to the specific steps of our method but claim as our invention all embodiments thereof coming within the scope of the appended claims.

We claim:

1. The method of regenerating spent sodium plumbite which includes the steps of heating a body of spent solution and subjecting said solution to relatively violent and then relatively gentle agitation to break up the emulsion therein and coagulate the oil whereby said oil may rise to the surface of the mixture, skimming off the oil so separated, discharging air into the remaining spent solution and intimately mixing and maintaining said air in contact with said solution, continuing such agitation and mixture of the solution with air until the regenerating reaction is completed.

2. In the regeneration of spent doctor solution the method which includes the steps of heating a body of spent solution and subjecting said solution to relatively violent and then relatively gentle agitation to break up the emulsion therein and coagulate the lead sulphide and the oil whereby said oil may rise to the surface of the mixture, skimming off the oil so separated, directing air into the spent solution, breaking up the air into finely disseminated condition in said solution and positively causing said body of solution to circulate in a manner to maintain the air in the solution and intimately mix it therewith, continuing such agitation and mixture of the solution with air until the regenerating reaction is completed.

3. In the regeneration of spent doctor solution the method which includes the steps of heating a body of spent solution and subjecting said solution to a violent agitation and scrubbing action to break the emulsion therein, subjecting the solution to a further relatively gentle agitation to coagulate the lead sulphide particles and the oil particles separated therefrom whereby the lead sulphide particles will settle and the oil particles will rise to the surface of the mixture, skimming off the oil so separated, maintaining the solution at approximately 175° F., directing an oxygen containing gas into the oil free solution, breaking up the gas into finely disseminated condition in said solution and positively causing said body of said solution to circulate in a manner to maintain the gas in the solution and intimately mix it therewith, continuing such agitation and mixture of the solution with the gas until the regenerating reaction is completed, adding sweetened washing oil to the regenerated solution and agitating the mixture to remove oil soluble discoloring impurities and then removing the wash oil from the solution.

FREDERICK W. STONE.
JAMES N. GARRISON.